US008391368B2

(12) United States Patent
Cheng et al.

(10) Patent No.: US 8,391,368 B2
(45) Date of Patent: Mar. 5, 2013

(54) MACRO-BLOCK BASED MIXED RESOLUTION VIDEO COMPRESSION SYSTEM

(75) Inventors: Hui Cheng, Bridgewater, NJ (US); Michael Anthony Isnardi, Plainsboro, NJ (US); Arkady Kopansky, Havertown, PA (US)

(73) Assignee: SRI International, Menlo Park, CA (US)

( * ) Notice: Subject to any disclaimer, the term of this patent is extended or adjusted under 35 U.S.C. 154(b) by 1449 days.

(21) Appl. No.: 11/401,990

(22) Filed: Apr. 10, 2006

(65) Prior Publication Data

US 2006/0245502 A1      Nov. 2, 2006

Related U.S. Application Data

(60) Provisional application No. 60/669,417, filed on Apr. 8, 2005, provisional application No. 60/717,495, filed on Sep. 15, 2005.

(51) Int. Cl.
*H04N 7/12* (2006.01)

(52) U.S. Cl. ......... 375/240.21; 375/240.01; 375/240.02; 375/240.12

(58) Field of Classification Search ............. 375/240.01, 375/240.21, 240.12, 240.02
See application file for complete search history.

(56) References Cited

U.S. PATENT DOCUMENTS

| 1,522,827 | A | 1/1925 | Moneuse |
| 4,505,297 | A | 3/1985 | Leech, III et al. |
| 5,074,331 | A | 12/1991 | Kassarjian |
| 5,209,765 | A | 5/1993 | Kolpak et al. |
| 5,407,274 | A | 4/1995 | Woerheide et al. |
| 6,354,318 | B2 | 3/2002 | Butler |
| 7,117,888 | B2 | 10/2006 | Niekolaas |
| 2001/0031003 | A1 | 10/2001 | Sawhney et al. |
| 2003/0161401 | A1 | 8/2003 | Shen et al. |
| 2004/0013195 | A1 | 1/2004 | Panusopone et al. |
| 2007/0189392 | A1* | 8/2007 | Tourapis et al. ......... 375/240.21 |
| 2007/0211798 | A1* | 9/2007 | Boyce et al. ............ 375/240.16 |

OTHER PUBLICATIONS

Alexis Michael Tourapis, Jill Boyce, Reduced Resolution Update Mode Extension to the H.264 Standard, IEEE, 2005.

* cited by examiner

*Primary Examiner* — Sath V Perungavoor
*Assistant Examiner* — Geepy Pe
(74) *Attorney, Agent, or Firm* — Moser Taboada

(57) ABSTRACT

A system and method of compressing a video signal can include the steps of: receiving a video signal, the video signal including frames; analyzing, for each frame, the video signal on a macroblock-by-macroblock level; determining whether to downsample a macroblock residual for each of the macroblocks; selectively downsampling a macroblock residual for some of the macroblocks; and coding the macroblocks. A system and method of decompressing a video signal can include the steps of receiving a compressed video signal, the video signal including frames; analyzing, for each frame, the video signal on a macroblock-by-macroblock level; determining whether to upsample a macroblock residual for each of the macroblocks; selectively upsampling a macroblock residual for some of the macroblocks; and decoding the macroblocks.

22 Claims, 13 Drawing Sheets

Figure 3

| $a_{0,0}$ | $a_{0,1}$ | $a_{0,2}$ | $a_{0,3}$ | $a_{0,4}$ | $a_{0,5}$ | . | . | . | $a_{0,15}$ |
|---|---|---|---|---|---|---|---|---|---|
| $a_{1,0}$ | $a_{1,1}$ | $a_{2,2}$ | $a_{2,3}$ | $a_{2,4}$ | $a_{2,5}$ | . | . | . | $a_{1,15}$ |
| $a_{2,0}$ | $a_{2,1}$ | $a_{2,2}$ | $a_{2,3}$ | $a_{2,4}$ | $a_{2,5}$ | . | . | . | $a_{2,15}$ |
| $a_{3,0}$ | $a_{3,1}$ | $a_{3,2}$ | $a_{3,3}$ | $a_{3,4}$ | $a_{3,5}$ | . | . | . | $a_{3,15}$ |
| $a_{4,0}$ | $a_{4,1}$ | $a_{4,2}$ | $a_{4,3}$ | $a_{4,4}$ | $a_{4,5}$ | . | . | . | $a_{4,15}$ |
| $a_{5,0}$ | $a_{5,1}$ | $a_{5,2}$ | $a_{5,3}$ | $a_{5,4}$ | $a_{5,5}$ | . | . | . | $a_{5,15}$ |
| . | . | . | . | . | . | . | . | . | . |
| . | . | . | . | . | . | . | . | . | . |
| . | . | . | . | . | . | . | . | . | . |
| $a_{15,0}$ | $a_{15,1}$ | $a_{15,2}$ | $a_{15,3}$ | $a_{15,4}$ | $a_{15,5}$ | . | . | . | $a_{15,15}$ |

Figure 4

| $b_{0,0}$ | $b_{0,1}$ | $b_{0,2}$ | $b_{0,3}$ | $b_{0,4}$ | $b_{0,5}$ | . | $b_{0,7}$ |
|---|---|---|---|---|---|---|---|
| $b_{1,0}$ | $b_{1,1}$ | $b_{2,2}$ | $b_{2,3}$ | $b_{2,4}$ | $b_{2,5}$ | . | $b_{1,7}$ |
| $b_{2,0}$ | $b_{2,1}$ | $b_{2,2}$ | $b_{2,3}$ | $b_{2,4}$ | $b_{2,5}$ | . | $b_{2,7}$ |
| $b_{3,0}$ | $b_{3,1}$ | $b_{3,2}$ | $b_{3,3}$ | $b_{3,4}$ | $b_{3,5}$ | . | $b_{3,7}$ |
| $b_{4,0}$ | $b_{4,1}$ | $b_{4,2}$ | $b_{4,3}$ | $b_{4,4}$ | $b_{4,5}$ | . | $b_{4,7}$ |
| $b_{5,0}$ | $b_{5,1}$ | $b_{5,2}$ | $b_{5,3}$ | $b_{5,4}$ | $b_{5,5}$ | . | $b_{5,7}$ |
| . | . | . | . | . | . | . | . |
| $b_{7,0}$ | $b_{7,1}$ | $b_{7,2}$ | $b_{7,3}$ | $b_{7,4}$ | $b_{7,5}$ | . | $b_{7,7}$ |

Figure 5

| $c_{0,0}$ | $c_{0,1}$ | $c_{0,2}$ | $c_{0,3}$ | $c_{0,4}$ | $c_{0,5}$ | . | . | . | $c_{0,15}$ |
|---|---|---|---|---|---|---|---|---|---|
| $c_{1,0}$ | $c_{1,1}$ | $c_{2,2}$ | $c_{2,3}$ | $c_{2,4}$ | $c_{2,5}$ | . | . | . | $c_{1,15}$ |
| $c_{2,0}$ | $c_{2,1}$ | $c_{2,2}$ | $c_{2,3}$ | $c_{2,4}$ | $c_{2,5}$ | . | . | . | $c_{2,15}$ |
| $c_{3,0}$ | $c_{3,1}$ | $c_{3,2}$ | $c_{3,3}$ | $c_{3,4}$ | $c_{3,5}$ | . | . | . | $c_{3,15}$ |
| $c_{4,0}$ | $c_{4,1}$ | $c_{4,2}$ | $c_{4,3}$ | $c_{4,4}$ | $c_{4,5}$ | . | . | . | $c_{4,15}$ |
| $c_{5,0}$ | $c_{5,1}$ | $c_{5,2}$ | $c_{5,3}$ | $c_{5,4}$ | $c_{5,5}$ | . | . | . | $c_{5,15}$ |
| . | . | . | . | . | . | . | . | . | . |
| . | . | . | . | . | . | . | . | . | . |
| . | . | . | . | . | . | . | . | . | . |
| $c_{15,0}$ | $c_{15,1}$ | $c_{15,2}$ | $c_{15,3}$ | $c_{15,4}$ | $c_{15,5}$ | . | . | . | $c_{15,15}$ |

MACRO-BLOCK BASED MIXED RESOLUTION VIDEO COMPRESSION SYSTEM

CROSS-REFERENCE TO RELATED APPLICATIONS

This application claims the benefit of U.S. Provisional Patent Application Nos. 60/669,417, filed Apr. 8, 2005, and 60/717,495, filed Sep. 15, 2005, both of which are hereby incorporated herein by reference.

GOVERNMENT RIGHTS IN THIS INVENTION

This invention was made with U.S. government support under contract number 70NANB3H3053. The U.S. government has certain rights in this invention.

FIELD OF THE INVENTION

Embodiments of the invention relate generally to a video encoding systems, and, more particularly, to systems and methods for achieving data compression via video encoding systems.

BACKGROUND OF THE INVENTION

Traditional video compression/decompression processing typically strives to compress video signals to reduce bandwidth and needed memory usage. Over the years, systems have been developed which compress a video data stream, using certain algorithms, and then decompress the video data stream, to achieve acceptable image clarity. The compression can be achieved by way of certain algorithms, which, for example, predictively calculate the movement of pixels of a video image on a frame-by-frame basis.

Transmission of uncompressed video requires very large bandwidth and is impractical in many cases because bandwidth is both limited and expensive. As a result, a much more efficient way of transmitting video is to compress it before transmission. Because video material is highly redundant, it can be efficiently compressed. The state of the art video coding standard at the time this document is written is the H.264/JVT/AVC/MPEG-4 part 10. This standard introduces a number of tools that allow it to achieve approximately 50% better compression performance as compared with the previous state of the art compression standards, such as MPEG-4 or H.263. However, even with these gains, better compression is still desirable. For example, a cable, phone, or satellite company with certain available bandwidth would be able to offer its customers more video channels if better compression techniques were available and acceptable subjective quality could be maintained.

Accordingly, a need exists for improved systems and methods for compressing and decompressing video data.

SUMMARY OF THE INVENTION

Embodiments of the present invention satisfy these and other needs by providing a system and method for macro-block based mixed resolution video compression.

Embodiments of a system and method of compressing a video signal can include the steps of: receiving a video signal, the video signal including frames; analyzing, for each frame, the video signal on a macroblock-by-macroblock level; determining whether to downsample a macroblock residual for each of the macroblocks; selectively downsampling a macroblock residual for some of the macroblocks; and coding the macroblocks.

Embodiments of a system and method of decompressing a video signal can include the steps of receiving a compressed video signal, the video signal including frames; analyzing, for each frame, the video signal on a macroblock-by-macroblock level; determining whether to upsample a macroblock residual for each of the macroblocks; selectively upsampling a macroblock residual for some of the macroblocks; and decoding the macroblocks.

BRIEF DESCRIPTION OF THE DRAWINGS

The invention can be understood from the detailed description of exemplary embodiments presented below, considered in conjunction with the attached drawings, of which:

FIG. 3 is a table displaying full-resolution residual data in accordance with embodiments of the invention;

FIG. 4 is a table displaying reduced-resolution residual data in accordance with embodiments of the invention;

FIG. 5 is a table displaying unsampled residual data, in accordance with embodiments of the invention;

It is to be understood that the attached drawings are for purposes of illustrating the concepts of the invention.

DETAILED DESCRIPTION OF THE INVENTION

Embodiments of the invention provide for a system and method for macro-block based mixed resolution video compression.

Embodiment of the invention are directed to a macroblock (MB) based Mixed Resolution Video Encoding system that improves the video compression efficiency compared with the current state of the art video compression standard (JVT/H.264/MPEG-4 Part 10, as are known to those of skill in the art) by an average of 15% while good subjective video quality is maintained.

The approach for improving compression efficiency being described here is the macroblock-based mixed-resolution (MBMR) system. This system is a superset of the H.264 video compression standard and includes, in addition to all of the JVT (Joint Video Team) tools, other enhancements that allow better compression performance. These new tools include Reduced Resolution Residual Coding (RRRC) and Tweening-Based Temporal Interpolation (TBTI). Tweening is described, for example, in U.S. Pat. No. 6,907,073 to Sawhney, et al. Integration of these tools with the standard JVT tools is described in detail below.

Encoding with Reduced Resolution Residual Coding Support.

Figure 7:
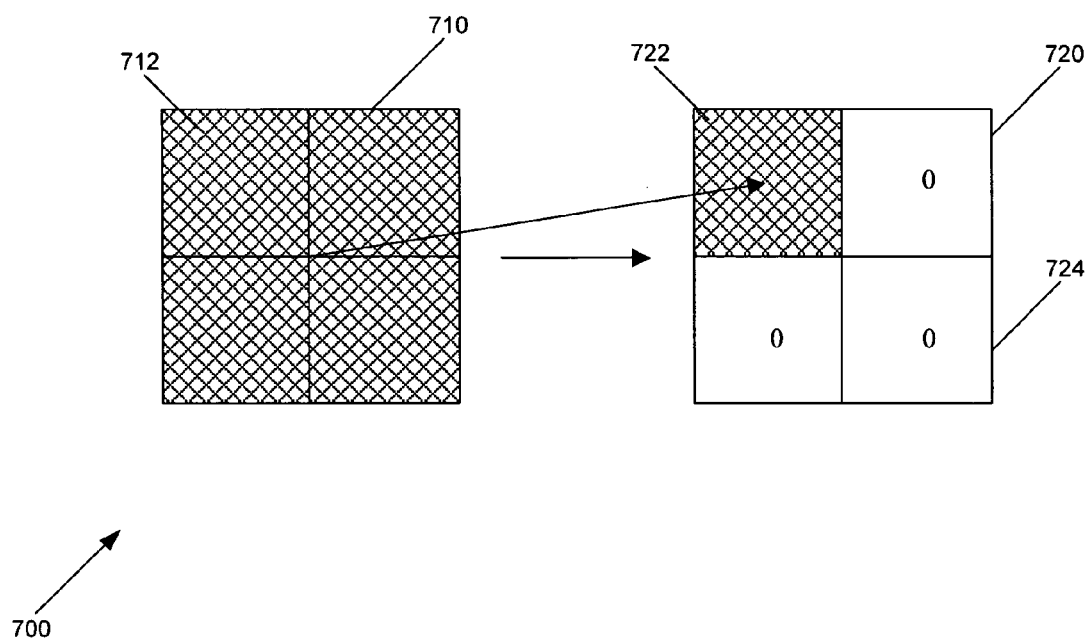
FIG. 7 is a schematic diagram illustrating a Residual downsampling for 8×8 modes, in accordance with embodiments of the invention.
Figure 8:
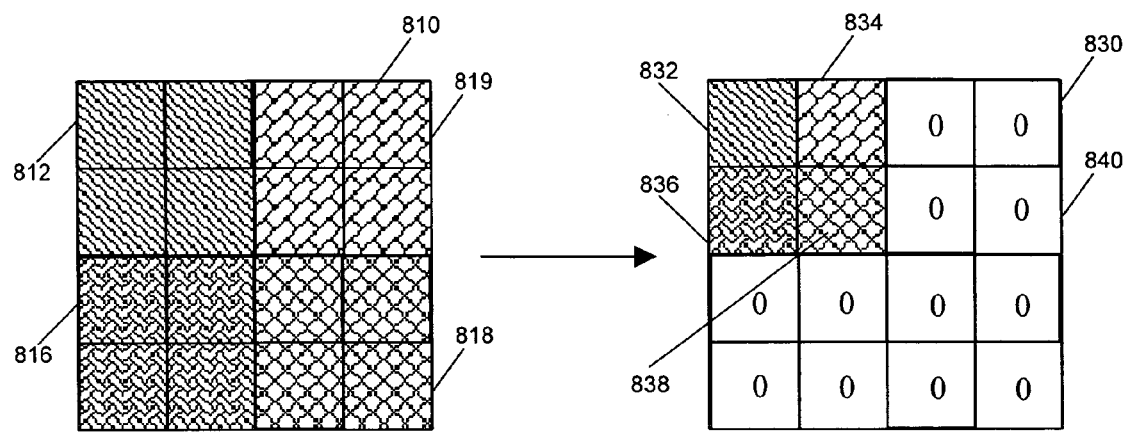
FIG. 8 is a schematic diagram illustrating a Residual downsampling for 4×4 modes, in accordance with embodiments of the invention.

Reduced Resolution Residual Coding (RRRC) supports optional downsampling of the macroblock residual data (a macroblock residual). The downsampled residual data are rearranged (as shown in FIGS. 7 and 8), then transformed, quantized, coded and transmitted. At the decoder, the process is reversed, that is, after inverse quantization/transformation, the downsampled residual (macroblock residual) is upsampled and the decoding process continues as in the standard decoder.

The downsampling can take place due to the fact that in many cases a good predictor for the current macroblock data is available and the discarded coefficients can be approximated so that good subjective video quality can still be maintained. Downsampling of the residuals for either inter and/or intra macroblocks can take place in all frame types, including I (non-predictive frame, used as reference), P (predictive frame, used as reference), B (bi-predictive frame, not used as reference) and Bs (bi-predictive frame, used as reference) frames. Because processing is done at the macroblock level, it is possible to choose the best mode for each macroblock, that is, for all frames a decision can be made on whether to code a macroblock (MB) residual at full resolution or to downsample the residual and then code, depending on whether or not the compressed macroblock is deemed to be too different from the original macroblock. Thus, within the same frame some macroblocks may be coded at mixed or reduced resolution (where the residual has been downsampled but the MB predictor is full resolution) while other macroblocks may be coded at fill resolution. Note that while some additional bits may be spent for coding the current frame to maintain good visual quality, additional bit savings may come from coding other frames that use the current frame as a higher-quality reference. As used herein, without loss of generality, a macroblock is defined as four 8×8 blocks of luma information and two 8×8 blocks of chroma information form a 16×16 area of a video frame, as is known to those of skill in the art. As used herein, a macroblock can include other block and area values, as is known to those of skill in the art.

Figure 1:
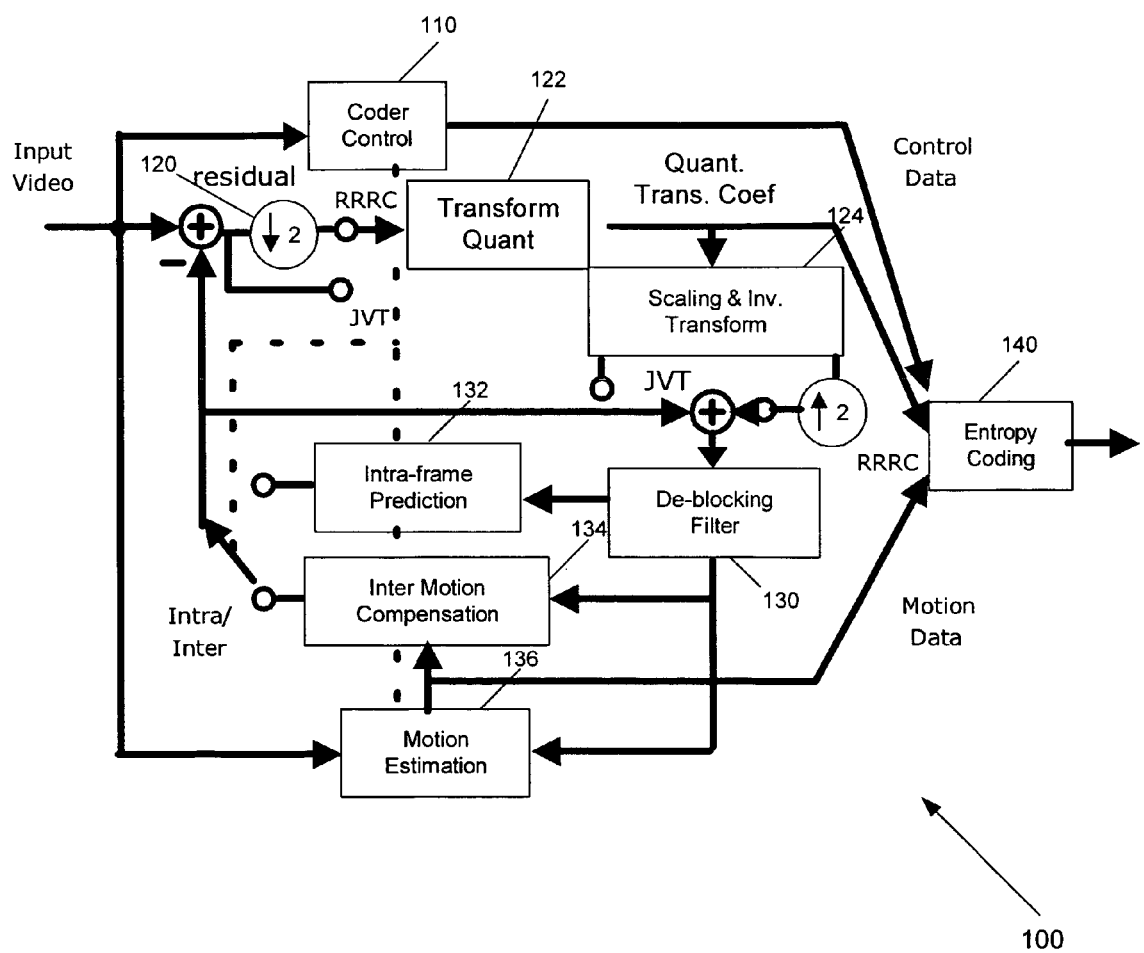
FIG. 1 is a block diagram of an encoder with MBMR coding support, in accordance with embodiments of the invention.

A block diagram of the encoder 100 with MBMR support is shown in FIG. 1. All frames are processed as follows. For each macroblock a residual (macroblock residual) is computed (as the difference between the original MB data and its predictor), as per JVT. It should be noted that in H.264 there is prediction for both intra (from neighboring blocks that have already been coded) and inter (motion compensated) macroblocks. As a result, the residual can be computed for both intra 132 and inter 134 macroblocks. Either the full-resolution JVT or RRRC mode can be selected. In RRRC mode the residual is downsampled 120 by a factor of 2×2 (although other factors are also possible) so that if in the standard JVT mode a maximum of 256 coefficients per macroblock is possible, in RRRC mode there are at most 64 coefficients. The processing continues as in JVT and either the full-resolution residual or the downsampled one is transformed, quantized, and coded 140. Steps not specifically discussed, such as for example, steps 110, 130, 124 and 136 operate in a manner similar to known compression/decompression systems.

Figure 2:
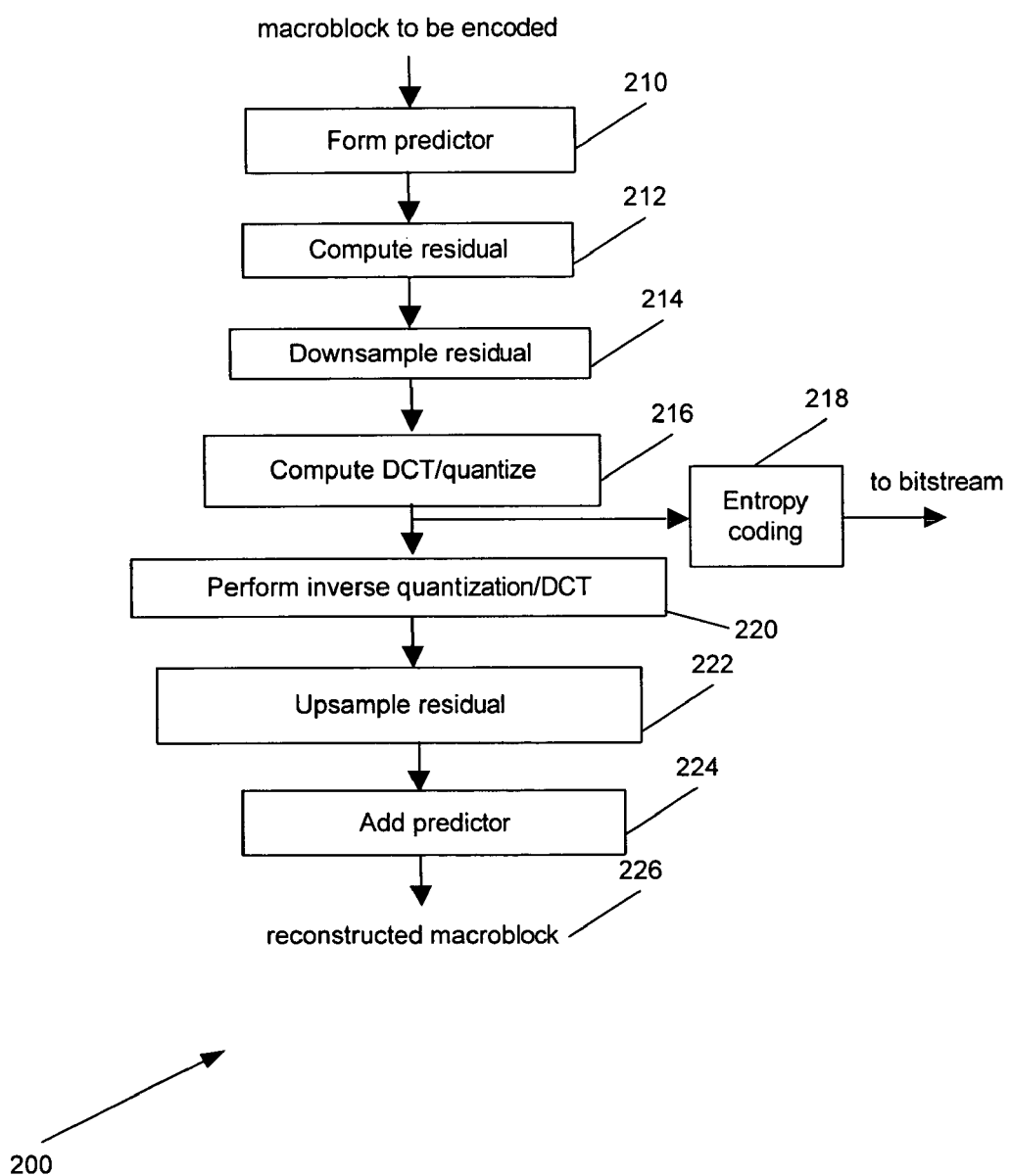
FIG. 2 is a flow diagram illustrating a method of encoding of macroblocks in RRRC mode in accordance with embodiments of the invention.

With reference to FIG. 2, there is shown a specific sequence of steps 200 taken to encode an MB in RRRC mode. The procedure is similar for both inter and intra coded macroblocks but differs in details of how predictors are formed, due to the fact that in the intra modes data from the current MB that has been just coded are used for prediction, whereas for inter modes it is not. For inter MB modes a predictor is formed after motion estimation 210, residual between the original MB data and the predictor is computed 212 as the difference between the two, and this residual is then downsampled 214, rearranged (as shown in FIGS. 4 and 5), transform coded and quantized 216. At this point, the reduced resolution data is entropy coded and output to the bitstream 218. To match information available to the decoder for prediction of the subsequent frames, as in JVT, inverse quantization and transformation take place 220 which in turn produce the reconstructed downsampled residual. This residual is upsampled 222, a predictor is added to it 224 and, finally, a reconstructed macroblock is output 226. The downsampling and upsampling methods for RRRC coding are described below.

Downsampling and Upsampling Methods for the RRRC Coding.

The downsampling and upsampling methods are as follows. Let $a_{i,j}$ ($i,j=0 \ldots 15$) denote the full-resolution residual data (FIG. 3) and $b_{i,j}$ ($i,j=0 \ldots 7$) the reduced-resolution residual data (FIG. 4). Then the coefficients $b_{i,j}$ that will be coded and transmitted in the RRRC mode are obtained as follows:

$$b_{i,j} = (a_{2i,2j} + a_{2i,2j+1} + a_{2i+1,2j} + a_{2i+1,2j+1})/4; \text{ for } i,j=0 \ldots 7; \quad (1)$$

Now, let $c_{i,j}$ ($i,j=0 \ldots 15$) denote the reconstructed upsampled residual data. For macroblocks coded in RRRC mode coefficients $b_{i,j}$ will be available to the decoder. Then the coefficients $c_{i,j}$ (FIG. 5) are obtained as follows:

$$c_{2i,2j} = \frac{\frac{1}{\sqrt{2}}b_{i,j} + \frac{1}{\sqrt{10}}b_{i,j-1} + \frac{1}{\sqrt{10}}b_{i-1,j} + \frac{1}{\sqrt{18}}b_{i-1,j-1}}{\frac{1}{\sqrt{2}} + 2\frac{1}{\sqrt{10}} + \frac{1}{\sqrt{18}}} \quad (2)$$

for $i, j = 0 \ldots 7$;

$$c_{2i,2j+1} = \frac{\frac{1}{\sqrt{2}}b_{i,j} + \frac{1}{\sqrt{10}}b_{i,j+1} + \frac{1}{\sqrt{10}}b_{i-1,j} + \frac{1}{\sqrt{18}}b_{i-1,j+1}}{\frac{1}{\sqrt{2}} + 2\frac{1}{\sqrt{10}} + \frac{1}{\sqrt{18}}} \quad (3)$$

for $i, j = 0 \ldots 7$;

$$c_{2i+1,2j} = \frac{\frac{1}{\sqrt{2}}b_{i,j} + \frac{1}{\sqrt{10}}b_{i+1,j} + \frac{1}{\sqrt{10}}b_{i,j-1} + \frac{1}{\sqrt{18}}b_{i+1,j-1}}{\frac{1}{\sqrt{2}} + 2\frac{1}{\sqrt{10}} + \frac{1}{\sqrt{18}}} \quad (4)$$

for $i, j = 0 \ldots 7$;

-continued $$c_{2i+1,2j+1} = \frac{\frac{1}{\sqrt{2}}b_{i,j} + \frac{1}{\sqrt{10}}b_{i+1,j} + \frac{1}{\sqrt{10}}b_{i,j+1} + \frac{1}{\sqrt{18}}b_{i+1,j+1}}{\frac{1}{\sqrt{2}} + 2\frac{1}{\sqrt{10}} + \frac{1}{\sqrt{18}}} \quad (5)$$

for $i, j = 0 \ldots 7$;

For border coefficients, should a particular one be unavailable in (2)-(5), its value is replaced by the nearest available coefficient. For instance, $b_{-1,-1}=b_{0,0}$; $b_{-1,1}=b_{0,1}$; $b_{8,3}=b_{7,3}$; and, $b_{8,8}=b_{7,7}$. It should be noted that more sophisticated upsampling and downsampling filters may also be used.

Mode Decision for the RRRC Coding.

In the standard JM, the cost of coding a macroblock in each mode is calculated and macroblock is coded in whichever mode that minimizes this cost. When downsampling of residuals is enabled, a second cost is computed—that of coding the macroblock in the RRRC mode. In the simplest case macroblock is coded in RRRC mode if the cost of coding an MB in the RRRC mode is less than the cost of coding an MB in one of the standard modes. More specifically, the cost of coding an MB in RRRC mode is $$J_{RRRC} = D_{RRRC} + \lambda R_{RRRC},$$

where D is distortion, R is rate in bits, and λ is the Lagrangian multiplier. This assumes that rate-distortion optimization is used to make mode decisions—rate-distortion optimization is recommended by the JVT for all experiments and all experimental results are reported for this case. The RRRC mode is used if $$J_{RRRC} < J_{JM}$$

Figure 6:
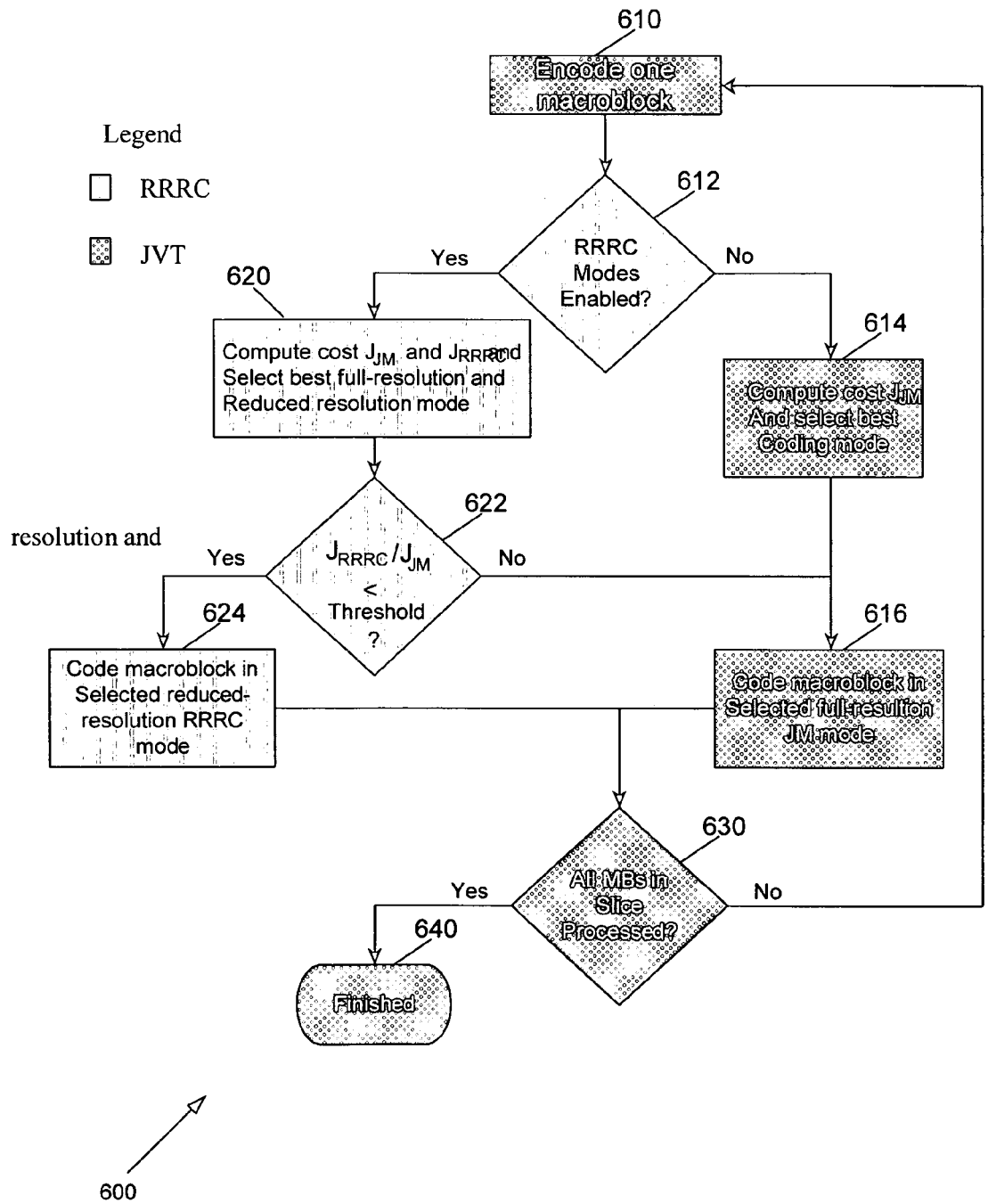
FIG. 6 is a flow diagram illustrating a Mode decision for RRRC/JM in the encoding loop, in accordance with embodiments of the invention.

In the more general case, the current implementation has (and uses) the flexibility to alter the decision process. It was experimentally determined that higher distortion can be tolerated without any visible artifacts. Then, the RRRC mode is used if $$J_{RRRC}/J_{JM} < \text{Threshold},$$

where Threshold is mode and frame type dependent. FIG. 6 shows a block diagram 600 of how the mode decision is incorporated into the encoding loop on a macroblock level. As is depeicted, steps 612, 620, 620, 622 and 624 comprise embodiments of the invention, while steps 610, 614, 616, 630 and 640 are similar to known methods of video encoding.

Implicit Mode Decision Signaling.

Explicit signaling of whether or not an MB is coded using RRRC mode will partially negate the bit saving achieved through the resolution reduction of residuals, and is thus undesirable. Therefore, an Implicit Signaling of Mode Decision was devised. Dividing an MB into 2×2, four quadrants (2×2 8×8 blocks), if only the upper-left quadrant of this macroblock has non-zero DCT coefficients, the Reduced Resolution Residual Decoding is always applied to avoid mode ambiguity at the decoder. Thus, when using Implicit Signaling, the encoder will ensure that no MB coded using standard JVT approach has only the first quadrant with non-zero DCT coefficients.

To illustrate how a decoder will determine whether or not the residual for a particular macroblock has been downsampled, consider the following. Information on whether residual data of a particular 8×8 block within a macroblock contain nonzero DCT coefficients is signaled via syntax element Coded Block Pattern (CBP). Without loss of generality, consider only luma for which coded block pattern for luma (abbreviated CBPY) can be extracted from CBP as the 4 least significant bits. Any particular bit set to 1 would indicate that the corresponding 8×8 block has nonzero coefficients. For instance, using binary notation CBPY=0101 would signal that an upper-left and lower left 8×8 blocks have nonzero coefficients. If a macroblock has been coded at the reduced resolution, CBPY=0001 (the only non-zero DCT coefficients are present in the upper-left 8×8 block, block 0). Any value of CBPY other than 1 would indicate full-resolution coding for that macroblock. Note that this signaling is applicable to both inter and intra coded macroblocks.

Intra Prediction.

For intra RRRC modes, how a predictor is formed is modified from the standard JVT behavior for 8×8 intra and 4×4 intra modes. In 8×8 intra mode after the residual is downsampled the data for the entire 16×16 macroblock is contained in the top left 8×8 quadrant, as illustrated in FIG. 7. As a result, the standard JVT 16×16 intra prediction is used and a single 16×16 predictor is formed. Note that in this case only a single intra prediction mode must be indicated in the bitstream, instead of the 4 that are transmitted for the full-resolution macroblock. Similarly, in 4×4 intra mode 8×8 intra prediction is used since each 4×4 block in the top left 8×8 quadrant contains data corresponding to the 8×8 full resolution block, as illustrated in FIG. 8. Thus, 4 8×8 predictors will be formed. Only four intra prediction modes must be signaled in this case, instead of the 16 for the full-resolution MB.

Chroma Processing.

Reference JM software includes provision for discarding "expensive" (in the rate-distortion tradeoff sense meaning a relatively large number of bits is used for a very small improvement in visual quality) coefficients. Specifically, if after quantization there are only few small nonzero coefficients per macroblock these few coefficients are forced to zero, depending on whether the "cost" of coding these coefficients exceeds a fixed threshold. In order to improve compression efficiency this process is modified and an adaptive discarding of chroma AC coefficients is introduced, depending on the frame type. Three different thresholds are used and the threshold is smallest for the I frames and largest for the B frames.

Let cost[blk] denote the "cost" of coding chroma coefficients for each quadrant blk in the current macroblock. Similarly, cost_MB is the cost of coding chroma coefficients for the macroblock. Using C-style code notation the cost_MB is computed in the reference encoder as:

```
cost_MB = 0;
for(blk=0;blk<4;blk++)
{
    cost[blk] = 0;
    for(j=0;j<4;j++)
    {
        for(i=0;i<4;i++)
        {
            if( (i != 0) && (j != 0) )
                cost[blk] += ( level[i,j] > 1 ? MAX_NUM :
                    COEFF_COST[run]);
        }
    }
    cost_MB += cost[blk];
}
``` where i,j is the location of the DCT coefficient (DC coefficient is at position 0,0 and is specifically exluded from this computation), level[i,j] is the value of the quantized DCT coefficient at location [i,j], MAX_NUM=99999, run is the number of quantized to zero DCT coefficients between the non-zero quantized coefficient level[i,j] and previous non-zero quantized coefficient, and COEFF_COST[16]={3,2,2,1,1,1,0,0,0,0,0,0,0,0,0,0}. All quantized chroma AC coefficients are discarded (set to zero) if the cost_MB is below threshold CHROMA_COEF_COST (selected to be 4 for the reference encoder):

```
if(cost_MB < CHROMA_COEFF_COST)
    discardChromaCoeffsAC( );
```

The decision to discard chroma AC coefficients is modified as follows. Instead of using a single threshold, CHROMA_COEFF_COST, separate frame_type adaptive thresholds are introduced.

```
if (frame_type==I_SLICE)
    chroma_threshold_cost = MAX_VALUE +
    CHROMA_COEFF_COST;
else if (frame_type == P_SLICE)
    chroma_threshold_cost =    MAX_VALUE    +
2*CHROMA_COEFF_COST;
else if (frame_type == B_SLICE)
    chroma_threshold_cost = 2147483647;
if (cost_MB < chroma_threshold_cost)
    discardChromaCoeffsAC( );
```

Note that this approach to chroma processing is fully compliant with the standard since all decisions are made at the encoder and thus requires no changes at the decoder.

Decoding with Enabled RRRC Coding Support.

Figure 9:
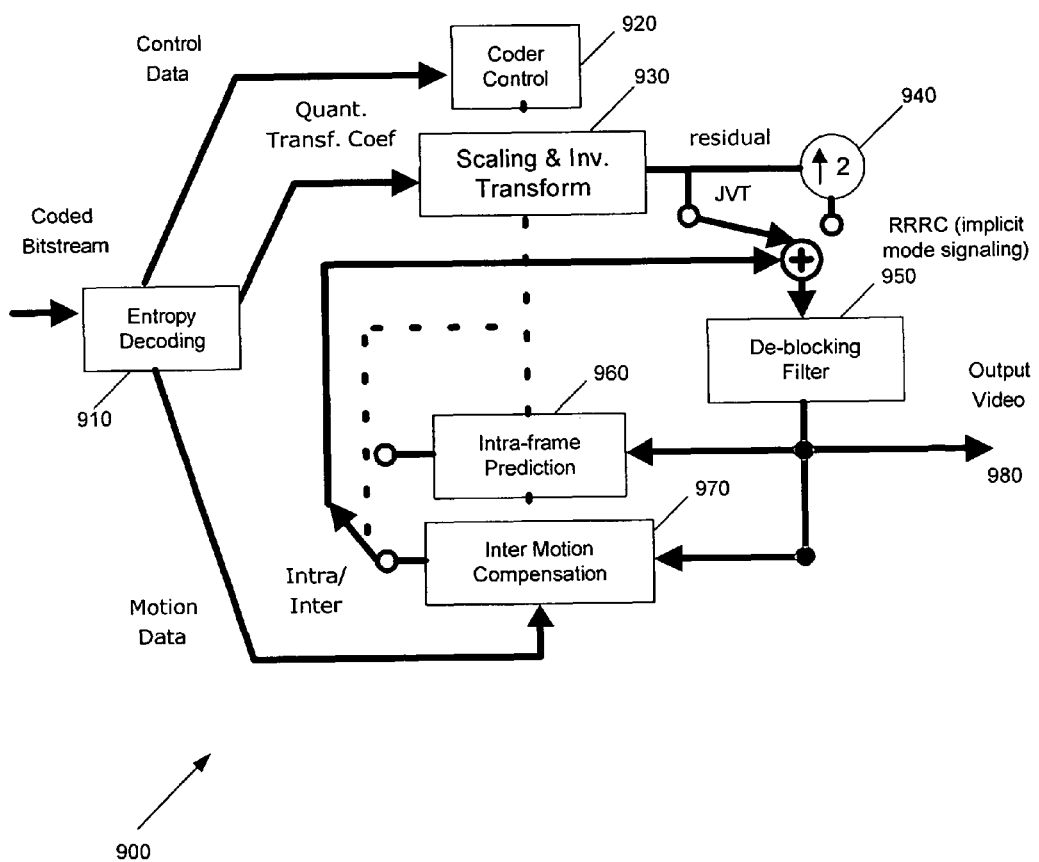
FIG. 9 is a block diagram illustrating a decoder with MBMR mode support, in accordance with embodiments of the invention.
Figure 10:
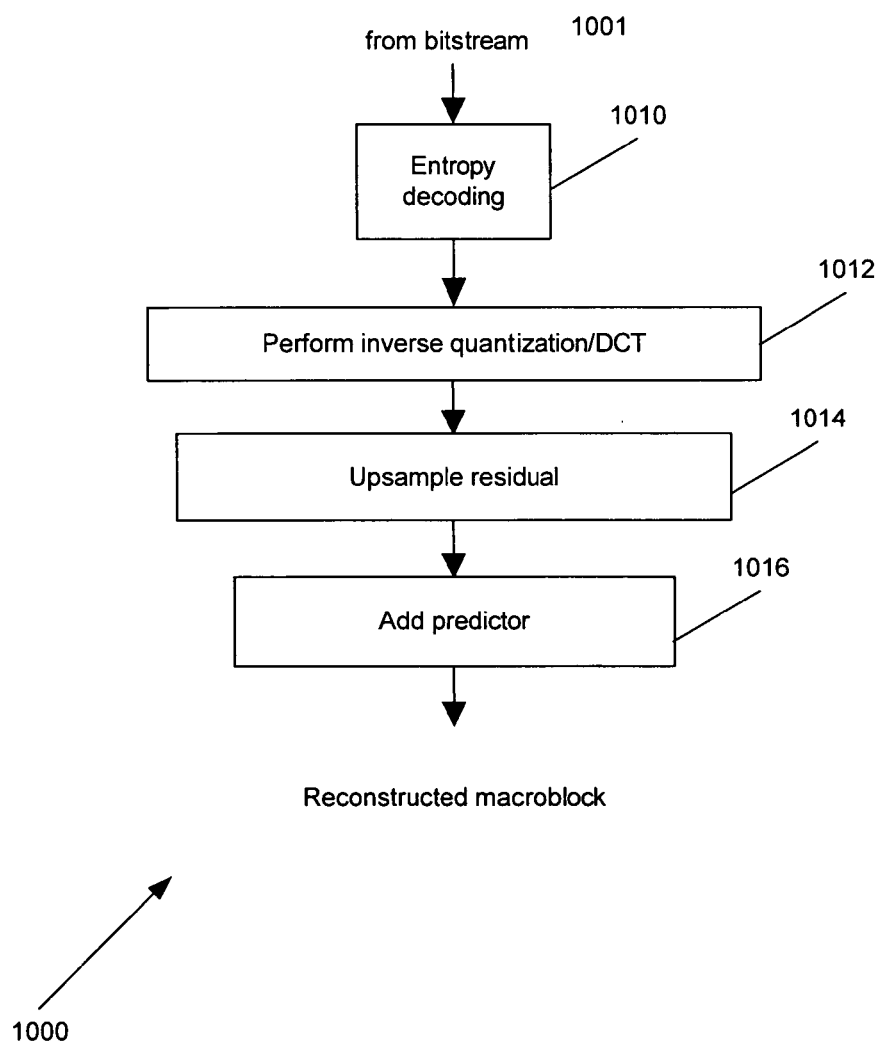
FIG. 10 is a flow diagram illustrating Decoding of macroblocks in RRRC mode, in accordance with embodiments of the invention.

A block diagram of the decoder 900 with RRRC mode support is shown in FIG. 9. As in JVT one macroblock at a time is decoded. First, the decoder uses implicit mode decision signaling to determine whether the current macroblock was coded at full resolution or at reduced resolution. Depending on whether or not the current macroblock was coded using the RRRC modes (in which case a downsampled residual was transmitted) or one of the standard, full-resolution JVT modes, the decoded residual (after entropy decoding 910, inverse transformation and scaling 930) is either upsampled 940 or left unchanged, respectively. In either case, a predictor is added to it and the reconstructed macroblock is obtained. Note that if a macroblock was coded using one of the intra RRRC modes, the decoder will form the predictor as described in the Intra Prediction section above. Specifically, a single 1 6×16 predictor will be formed for 16×16 or 8×8 intra RRRC modes or 4 8×8 predictors will be formed for 4×4 intra RRRC mode. As with FIG. 1, steps that are similar to those known in the art, such as steps 920, 930 950, 960 and 970 are not discussed in detail herein. Specific steps taken during decoding 1000 of RRRC macroblocks are shown in FIG. 10. A bitstream is received 1001. Entropy decoding is accomplished 1010. Inverse quantization is performed 1012. the Residual is upsampled 1014, and predictor is added 1016, and the macroblock is reconstructed.

Integration of Tweening-Based Temporal Interpolation into the MBMR Codec.

Figure 11:
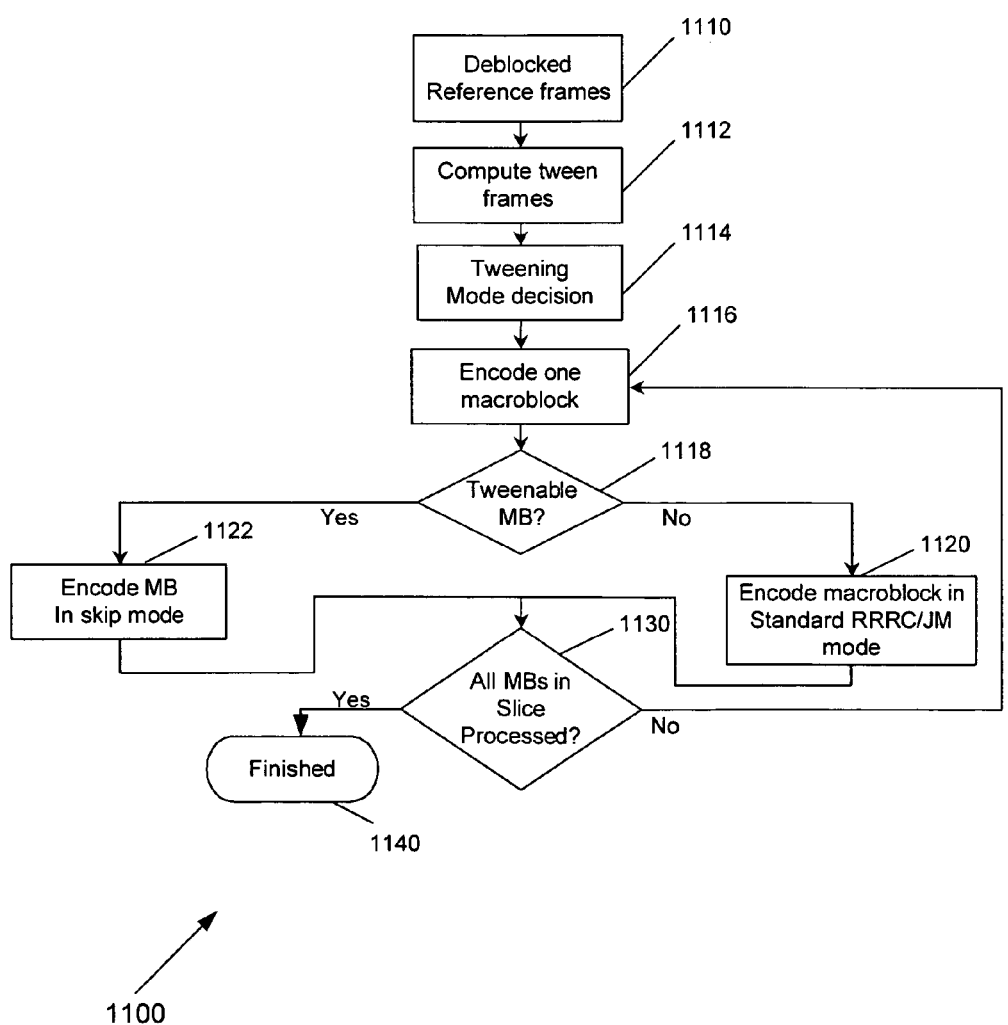
FIG. 11 is a flow diagram illustrating a method of Integration of TBTI into the coding loop, in accordance with embodiments of the invention.

In addition to the RRRC coding and chroma processing, a tweening-based algorithm 1100 can be used for improving compression efficiency. Specifically, tweening-based temporal interpolation (TBTI) works in tandem with the RRRC coding to further improve compression efficiency. Integration of TBTI functionality into the MBMR codec is shown in FIG. 11. TBTI functionality is in blocks 1110, 1120, 1130 and 1140. Tweeing is a general term given to any motion prediction algorithm that is more sophisticated than the linear translation model used by the JM.

At the encoder deblocked 1110, reconstructed reference frames immediately preceding and following (in the display order) the frame(s) to be tweened are used as an input to the tweening algorithm to produce the tween frame(s). Below, without loss of generality, it is assumed that only one tween frame is constructed between two reference frames. Using the reconstructed frames and the tween frame a decision is made on whether or not each macroblock can be reconstructed by tweening 1118. All macroblocks that can be tweened are flagged as such. This data is passed on to the RRRC encoder 1120 (itself a superset of the reference JM encoder), which then only encodes macroblocks that cannot be tweened. If a macroblock can be tweened it is encoded in B_skip mode 1122. As a result, coding of such macroblocks typically uses only a fraction of a bit (assuming arithmetic coding [CABAC—context-adaptive binary arithmetic coding] is used for entropy coding). Macroblocks that cannot be tweened are coded normally as either full resolution, standard macroblocks or as RRRC macroblocks. Note that no modes are disabled for macroblocks that cannot be tweened and thus there is no compression efficiency penalty for these macroblocks. In fact, if all tweenable macroblocks are correctly identified as such the encoder with TBTI support will always do as well as or better than the RRRC encoder as far as compression efficiency is concerned.

Figure 12:
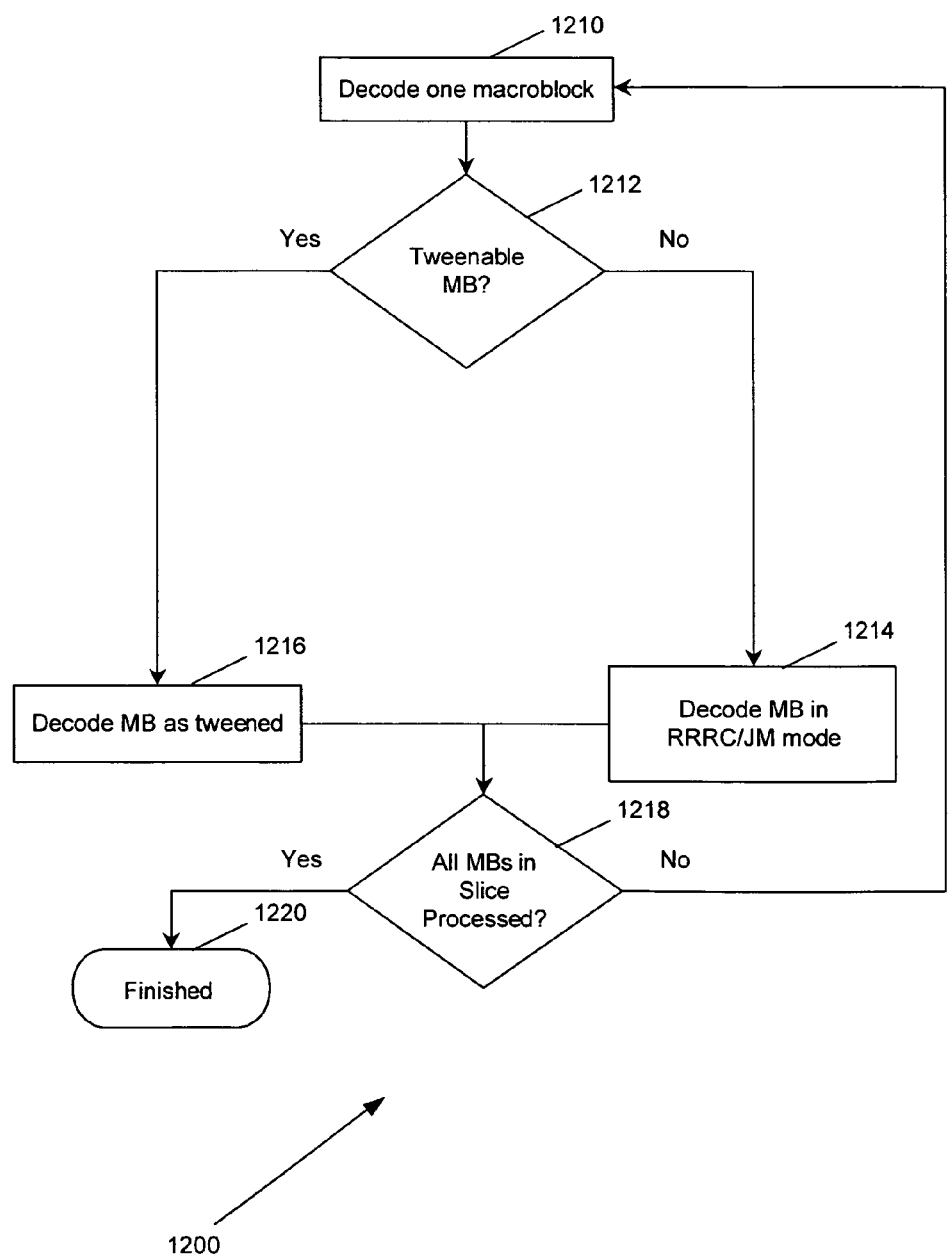
FIG. 12 is a flow diagram illustrating a method of MBMR (RRRC and TBTI without mode refinement) decoding, in accordance with embodiments of the invention.

Decoding of frames with enabled TBTI is shown in the block-diagram 1200 of FIG. 12. As depicted in steps 1210, 1212, 1214, 1216, 1218 and 1220, as in the encoder, deblocked, reconstructed reference frames immediately preceding and following (in the display order) the frame to be tweened are used as an input to the tweening algorithm to produce the tween frame. Note that the reference frames available at the decoder are identical to those available at the encoder and thus the tween frame identical to the one used by the encoder can be constructed at the decoder as well and the encoder decisions on which macroblocks can be tweened can be fully reproduced at the decoder. Macroblocks that are determined to have been tweened are decoded as such; otherwise, normal JM/RRRC decoding takes place.

Tweening Mode Decision Refinement.

In the vast majority of cases tweening mode decision process will correctly determine whether or not a macroblock can be reconstructed by tweening. However, on a rare occasion, a macroblock marked as "tweenable" may in fact not be. Should such an issue arise, visual quality degradation due to even a few incorrectly flagged macroblocks can be quite significant. As a result, it is desirable to be able to gracefully handle these incorrectly tweened macroblocks and minimize visual quality impact.

Figure 13:
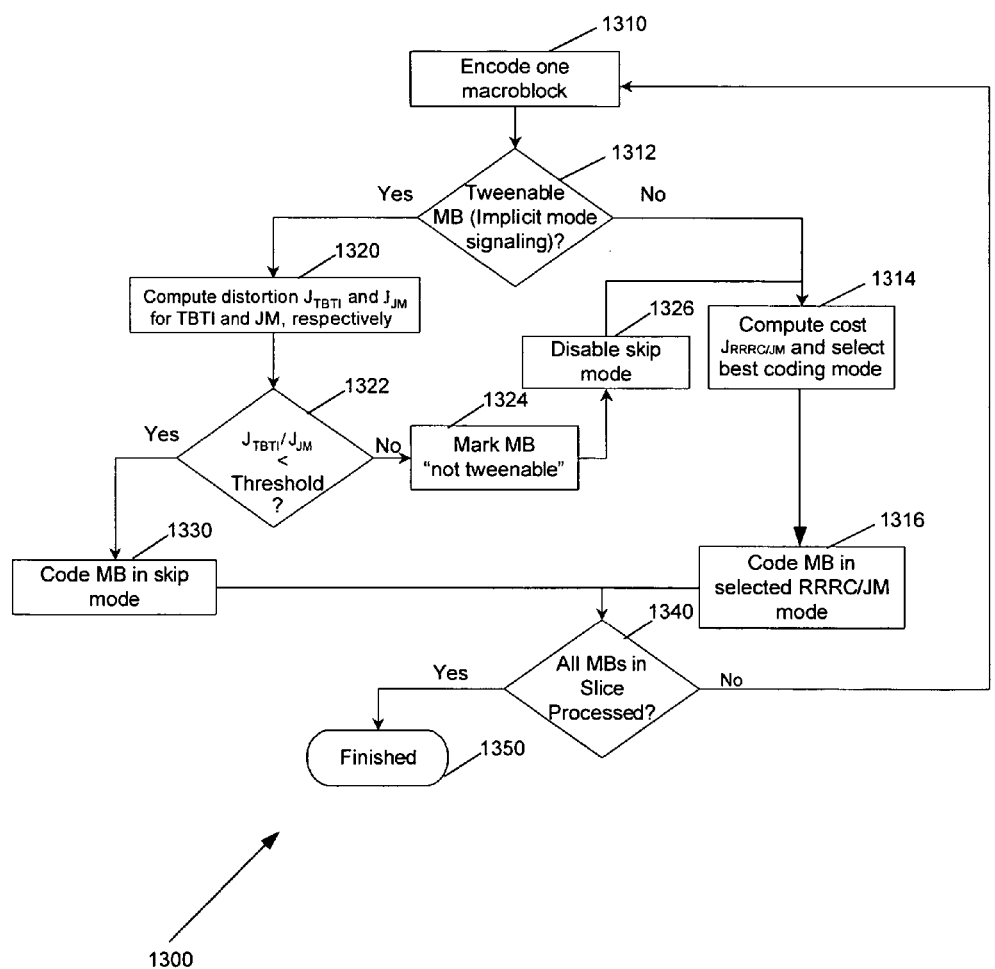
FIG. 13 is a flow diagram illustrating a method of TBTI mode refinement at the encoder, in accordance with embodiments of the invention.

Such a capability has been developed in the form of mode decision refinement at the encoder, a block-diagram 1300 of which appears in FIG. 13. For every macroblock that is marked "tweenable" an additional check is performed. Each such macroblock is coded at full resolution in intra4×4 mode and then two costs are computed 1320. One cost, JTBTI, is the distortion introduced by the tweened MB. The other cost, JJM, is the distortion introduced by coding the same MB in the JM mode. The distortion measure is the sum of squared differences (SSD) between the coded (either tweened or JM) and the original macroblock. If the distortion introduced by the TBTI is not too large 1322 (either absolute or relative to the distortion introduced by coding the macroblock in the JM mode), the MB is coded as tweened (B_skip) 1330. Otherwise, B_skip mode is disabled and the macroblock is coded in one of the other RRRC/JM modes 1316. The following C-style code describes how a decision is made on whether or not to code a TBTI MB using RRRC/JM:

```
if( (J_TBTI > Threshold_1) && (J_TBTI/J_JM > Threshold_2) )
    encodeUsingRRRC_or_JM( );
``` where Threshold_1 is the absolute threshold so that TBTI is used if the distortion introduced by tweening is small. If the distortion is large as indicated by Threshold_1, Threshold_2 is used to determine if the distortion is also large relative to that introduced by the normal JM mode.

Figure 14:
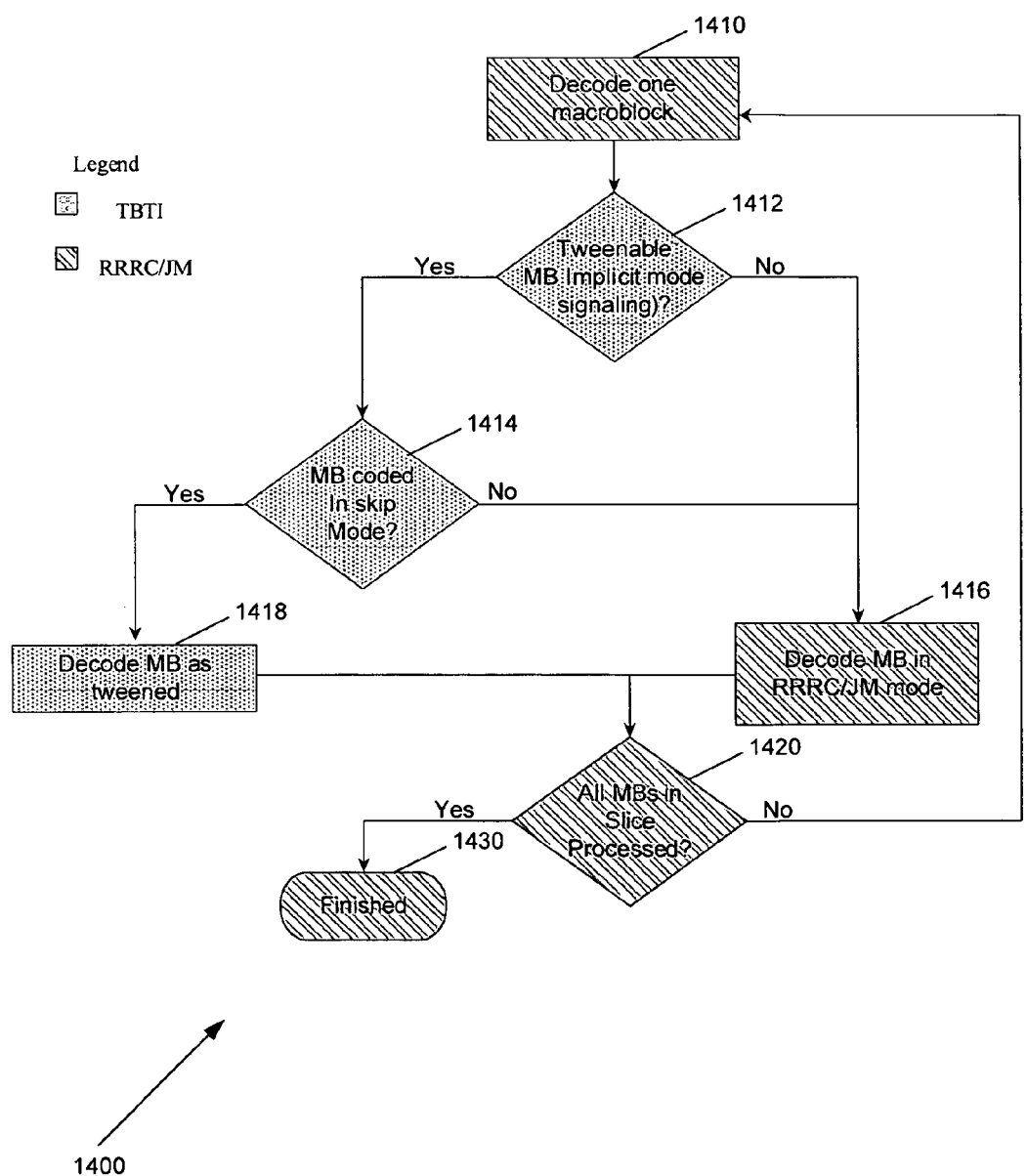
FIG. 14 is a flow diagram illustrating a method of MBMR (RRRC and TBTI with mode refinement) decoding, in accordance with embodiments of the invention.

A block-diagram 1400 of the decoder with mode decision refinement is shown in FIG. 14. As before, for each macroblock it is determined if an MB is tweenable. An additional check is performed 1414 for each macroblock that is tweenable, specifically, whether or not it was coded as B_skip. If tweenable MB is coded in B_skip mode, the macroblock is decoded as tweened. However, if an MB is coded in any other mode, it indicates that mode refinement took place at the encoder and the macroblock is decoded as an RRRC/JM macroblock.

It is to be understood that the exemplary embodiments are merely illustrative of the invention and that many variations of the above-described embodiments can be devised by one skilled in the art without departing from the scope of the invention. It is therefore intended that all such variations be included within the scope of the following claims and their equivalents.

What is claimed is:

1. A method of compressing a video signal, the method comprising the steps of:
   receiving a video signal, the video signal including frames;
   analyzing, for each frame, the video signal on a macroblock-by-macroblock basis;
   selecting at least one macroblock as a candidate for downsampling of residual of the macroblocks;
   comparing a cost of downsampling a macroblock residual in a standard mode to a cost of downsampling the macroblock residual in an alternate mode;
   downsampling the selected macroblock residual according to the compared cost; and
   coding the selected macroblock at one of a full residual resolution or reduced residual resolution.

2. The method of claim 1, comprising the steps of:
   rearranging each macroblock residual;
   transforming each macroblock residual; and
   quantizing each macroblock residual.

3. The method of claim 2, further comprising the step of:
   transmitting the macroblock residual.

4. The method of claim 1, wherein the downsampling is performed on at least one of inter macroblocks and intra macroblocks.

5. The method of claim 1, further comprising the step of:
   determining not to downsample some of the macroblock residuals; and
   coding some of the macroblocks at full resolution.

6. The method of claim 1
   wherein the alternate mode is a Reduced Resolution Residual Coding (RRRC) mode.

7. The method of claim 1, wherein implicit signaling is used to indicate when a macroblock is upsampled.

8. The method of claim 1, further comprising the step of:
   determining which frames can be tweened; and
   performing a tweening operation on the frames that can be tweened.

9. A method of decompressing a video signal, the method comprising the steps of:
   receiving a compressed video signal, the video signal including frames;
   analyzing, for each frame, the video signal on a macroblock-by-macroblock basis;
   selecting at least one macroblock to determine when the macroblock was transmitted with one of a full resolution residual or a reduced resolution residual:
   comparing a cost of upsampling a macroblock residual in standard mode to a cost of upsamplinq the macroblock residual in an alternate mode;
   upsampling the macroblock residual according to the compared cost; and
   decoding the selected macroblock as one of the full residual resolution macroblock or the reduced residual resolution macroblock.

10. The method of claim 9, further comprising the step of:
    determining whether to upsample a macroblock by use of implicit mode decisioning.

11. A method of transmitting a video signal, the method comprising the steps of:
    receiving a video signal, the video signal including frames;
    analyzing, for each frame, the video signal on a macroblock-by-macroblock basis;
    selecting at least one macroblock as a candidate for downsampling of residual of the macroblocks:
    comparing a cost of downsampling a macroblock residual in standard mode to a cost of downsampling the macroblock residual in an alternate mode;
    downsampling the selected macroblock residual and coding the selected macroblock at one of a full residual resolution or reduced residual resolution according to the compared cost;
    receiving a compressed video signal, the video signal including frames;
    analyzing, for each frame, the video signal on a macroblock-by-macroblock basis;
    selecting at least one macroblock to determine when the macroblock was transmitted with one of a full resolution residual or a reduced resolution residual;
    upsampling a the macroblock residual for the selected macroblock with the reduced resolution residual; and
    decoding the selected macroblock as one of the full residual resolution macroblock or the reduced residual resolution macroblock.

12. A system of compressing a video signal, the system comprising one or more processors configured to perform the steps of:
    receiving a video signal, the video signal including frames;
    analyzing, for each frame, the video signal on a macroblock-by-macroblock basis;
    selecting at least one macroblock as a candidate for downsampling of residual of the macroblocks;
    comparing a cost of downsampling a macroblock residual in standard mode to a cost of downsampling the macroblock residual in an alternate mode;
    downsampling the selected macroblock residual according to the compared cost; and
    coding the selected macroblock at one of a full residual resolution or reduced residual resolution.

13. The system of claim 12, the processors being configured to perform the steps of:
    rearranging each macroblock residual; transforming each macroblock residual;
    and quantizing each macroblock residual.

14. The method of claim 13, further comprising the step of: transmitting the macroblock residual.

15. The system of claim 12, wherein the downsampling is performed on at least one of inter macroblocks and intra macroblocks.

16. The system of claim 12, the processors being configured to perform the steps of:
   determining not to downsample some of the macroblock residuals; and coding some of the macroblocks at full resolution.

17. The system of claim 12, wherein the alternate mode is a Reduced Resolution Residual Coding (RRRC) mode.

18. The system of claim 12, wherein implicit signaling is used to indicate when a macroblock is upsampled.

19. The system of claim 12, further comprising the step of: determining which frames can be tweened: and performing a tweening operation on the frames that can be tweened.

20. A system for decompressing a video signal, the system comprising one or more processors configured for:
   receiving a compressed video signal, the video signal including frames:
   analyzing, for each frame, the video signal on a macroblock-by-macroblock basis;
   selecting at least one macroblock to determine when the macroblock was transmitted with one of a full resolution residual or a reduced resolution residual:
   comparing a cost of upsampling a macroblock residual in standard mode to a cost of upsamplinq the macroblock residual in an alternate mode;
   upsampling a the macroblock residual for the selected macroblock with the reduced resolution residual according to the compared cost; and
   decoding the selected macroblock as one of the full residual resolution macroblock or the reduced residual resolution macroblock.

21. The system of claim 20, the processors further configured for: determining whether to upsample a macroblock by use of implicit mode decisioning.

22. A system for transmitting a video signal, the system comprising one or more processors configured for:
   receiving a video signal, the video signal including frames;
   analyzing for each frame, the video signal on a macroblock-by-macroblock basis;
   selecting at least one macroblock as a candidate for downsampling of residual of the macroblocks;
   comparing a cost of downsampling a macroblock residual in a standard mode to a cost of downsamplinq the macroblock residual in an alternate mode;
   downsampling the selected macroblock residual according to the compared cost; and
   coding the selected macroblock at one of a full residual resolution or reduced residual resolution;
   receiving a compressed video signal, the video signal including frames;
   analyzing, for each frame, the video signal on a macroblock-by-macroblock basis;
   selecting at least one macroblock to determine when the macroblock was transmitted with one of a full resolution residual or a reduced resolution residual;
   selectively upsampling a the macroblock residual for the selected macroblock with the reduced resolution residual; and
   decoding the selected macroblock as one of the full residual resolution macroblock or the reduced residual resolution macroblock.

* * * * *